(12) United States Patent
Weber et al.

(10) Patent No.: US 6,274,241 B1
(45) Date of Patent: Aug. 14, 2001

(54) SUBSTRATES SEEDED WITH PRECIOUS METAL SALTS, PROCESS FOR PRODUCING THE SAME AND THEIR USE

(75) Inventors: Lothar Weber, Stuttgart; Thomas Brinz, Sindelfingen; Ulrich Eisele, Stuttgart; Dorothee Kling, Leonberg, all of (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/254,445
(22) PCT Filed: Aug. 20, 1997
(86) PCT No.: PCT/DE97/01790
 § 371 Date: Jun. 14, 1999
 § 102(e) Date: Jun. 14, 1999
(87) PCT Pub. No.: WO98/11273
 PCT Pub. Date: Mar. 19, 1998

(30) Foreign Application Priority Data

Sep. 9, 1996 (DE) .............................. 196 36 4930

(51) Int. Cl.[7] .................. B32B 5/16; B05D 1/18
(52) U.S. Cl. .................... 428/403; 205/163; 205/167; 427/215; 427/220; 427/222; 427/430.1; 427/443.1; 428/404; 428/406; 428/407; 428/936
(58) Field of Search ................. 428/323, 331, 428/403, 404, 406, 407, 936; 205/163, 167; 427/215, 217, 220, 222, 430.1, 443.1

(56) References Cited

U.S. PATENT DOCUMENTS

| 3,876,407 | * | 4/1975 | Hirose et al. | 65/30 |
|---|---|---|---|---|
| 5,264,288 | | 11/1993 | Das et al. | 428/434 |
| 5,384,154 | * | 1/1995 | De Bakker et al. | 427/123 |
| 5,492,613 | * | 2/1996 | Zhang et al. | 205/163 |
| 5,506,091 | | 4/1996 | Suzuki et al. | 430/324 |
| 5,759,230 | * | 6/1998 | Chow et al. | 75/362 |
| 6,110,278 | * | 8/2000 | Saxena | 117/95 |

FOREIGN PATENT DOCUMENTS

| 0 583 822 | 2/1994 | (EP) . |
|---|---|---|
| 62-252343 | 11/1987 | (JP) . |
| 63-227784 | 9/1988 | (JP) . |
| 88 02412 | 4/1988 | (WO) . |

OTHER PUBLICATIONS

T. Hamaya et al., "Electroless Nickel Depostion on the Glass Beads Pretreated with Aminosilane—The Correlation Between The Adsorption States and Catalytic Activity", Surface Treatment Technology Abstracts, vol. 32, No. 4, Jul. 1, 1990.

K. Grabar et al. "Two–Dimensional Arrays of Colloidal Gold Particles: A flexible Approach to Microscopic Metal Surfaces", Chemical Abstracts, vol. 124, No. 20, May 13, 1996.

* cited by examiner

Primary Examiner—Hoa T. Le
(74) Attorney, Agent, or Firm—Kenyon & Kenyon

(57) ABSTRACT

To provide a substrate enclosed in a uniform nucleation layer, a substrate is nucleated with a noble metal salt where the noble metal salt is chemically bound to the substrate, and a method is described for binding a noble metal salt chemically to a substrate. To provide a metal plated powder, a powder is nucleated with a noble metal salt and the nucleation is coated with a metal layer. A method is also provided for nucleating the powder surface with a noble metal salt in such a manner that it is chemically bound to the substrate and then metal plated by a conventional electroless method.

30 Claims, No Drawings

SUBSTRATES SEEDED WITH PRECIOUS METAL SALTS, PROCESS FOR PRODUCING THE SAME AND THEIR USE

FIELD OF THE INVENTION

The present invention relates to a substrate, a method of nucleation, a powder, and a method for metal plating.

BACKGROUND INFORMATION

Metal layers on a wide variety of substrates are used for applications in the electronics and electrical industry. Electroless metal plating is a valuable method of applying metal layers to such substrates regardless of the geometry or conductivity of the substrate. This method is described, for example, by Frederic A. Lowenheim: "Modern Electroplating," John Wiley & Sons, New York, and by Heinz W. Dettner, J. Elze: *Handbuch der Galvanotechnik Band II* (Handbook of Electroplating) Carl Hauser Verlag, Munich.

In electroless metal plating, the surface of the substrate to be metal plated is provided with nucleating seeds of the noble metal. Conventionally, this is accomplished in particular by reacting compounds containing $Sn^{2+}$ with compounds containing $Pd^{2+}$ according to the equation $$Sn^{2+} + Pd^{2+} \rightarrow Sn^{4+} + Pd$$

Palladium may be in the form of an aqueous $PdCl_2$ solution or an organic palladium solution into which the substrate is dipped or with which the substrate is sprayed or printed. The palladium is bound to the substrate by adsorption. In addition to palladium, platinum is also used as a nucleating metal, but palladium is preferred because of its lower price. Then at least one metal is chemically deposited on the nucleation layer by reducing one or more salts of the metal(s) to be deposited.

One disadvantage of conventional method is that it is difficult to achieve a uniform nucleation. To ensure that the nucleation layer is closed, a large quantity of nucleating metal relative to the substrate surface area is necessary in any case. Furthermore, electroless metal plating of powders has not been known in the past. It has been determined that coverage was very irregular when using the conventional method of nucleation and a subsequent electroless metal plating.

SUMMARY OF THE INVENTION

Substrates with the noble metal salt chemically bound to the substrate surface, are coated with a uniform, mostly closed nucleation layer. The thickness of this layer amounts to a maximum of a few layers of atoms. Therefore, the consumption of nucleation material is low per unit of area. In a subsequent metal plating, only a relatively small amount of metal is therefore necessary to ensure a uniform, mostly closed metal layer. It is advantageous if a group $X-(K)_m$ capable of bonding is bonded with residue X to the substrate surface by at least one oxygen bridge for the purpose of bonding the nucleation layer, and if group K is capable of complexing the noble metal salt, where m is an integer between 1 and 3, preferably 1. X is preferably selected from the group of silanyl moiety, hydrocarbon moiety, zirconyl moiety, titanyl moiety and moiety containing aluminum. Functional groups K which are especially suitable include a π function such as an alkenyl, alkynyl or aryl group, which may optionally be substituted, or an amino group. The present invention can be applied in an advantageous manner to oxidic substrates and substrate materials capable of forming an oxide film on the surface, in particular substrate materials selected from the group of glass, ceramics, nitride, oxynitride, carbide, silicide, zirconium oxide, nickel oxide, aluminate, aluminum oxide, plastics and combinations of two or more of these materials. It is also advantageous that the present invention can also be employed when the nucleated substrate is in the form of a powder with a particle size in the range between approximately 100 nm and approximately 300 μm. One of the advantages of the present invention is that controlled nucleation can be performed not only on whole flat substrates but also on powders, and thus controlled metal plating is also possible. A very fine, uniform distribution of the noble metal nucleation on the substrate surfaces can be achieved in particular by complexing. The noble metal is preferably a metal of group VIIIB, especially palladium or platinum, but palladium is most preferred because it is less expensive than platinum.

The method where the noble metal salt is chemically bound to the substrate surface, is suitable in particular for producing the nucleated substrate according to the present invention. It is advantageous here if the noble metal salt is bound to the substrate by the mediation of a compound that is at least bifunctional and can enter into a reaction with the substrate surface on the one hand and with the noble metal salt on the other hand. It is also advantageous if an oxidic substrate surface or a substrate surface coated with an oxide film is made to react with a compound of the general formula $(A)_n-X-(K)_m$, where A is a reactive group that can react with the hydrate shell on an oxide to form an oxygen bridge to the X group, K is a group that complexes the noble metal, and n and m are integers between 1 and 3, with n and m most preferably each being 1, i.e., the compound is bifunctional, and then it is reacted with a soluble complex noble metal compound capable of ligand exchange with the K group, and the salt is optionally reduced in a known manner. It is preferable if X and K have the same meanings as in the group $X-(K)_m$ (discussed above), and A is selected from the group of halogen, ester group, carboxyl group and acid halide group. Advantageous representatives of the above-mentioned compound are selected from the group of allyldimethylchlorosilane, oleic acid or linoleic acid, naphthenic acids and aminopropylmethyldiethoxysilane.

In carrying out this method, it is advantageous if the noble metal salt used in the process is complexed with a complexing agent such as cyclooctadiene or benzonitrile which is capable of ligand exchange with the functional group K. To improve the adhesion of the nucleation material and to facilitate the reaction of the substrate surface with the bifunctional compound, it is advantageous if the substrate is treated before nucleation with digestion agents such as alkali metal hydroxide, in particular with sodium hydroxide or solutions containing hydrofluoric acid such as a hydrofluoric acid solution or solutions containing $HF/NH_4F$ mixtures. The method according to the present invention can be used when the substrate material is selected from one of the above-mentioned materials.

With the present invention it is possible to provide a nucleated powder which is coated with a metal layer. The powder according to the present invention has advantageous properties if the nucleation is chemically bound to the powdered surface, and in order to bind the nucleation layer it is advantageous if a group $X-(K)_m$ that is capable of binding is bound with the group X to the substrate surface by at least one oxygen bridge, and the functional group K is capable of complexing the noble metal salt, with m being an integer between 1 and 3, preferably 1. It is advantageous if X is selected from the group of silanyl moiety, hydrocarbon moiety, zirconyl moiety, titanyl moiety and moiety containing aluminum. Especially suitable functional groups K would include a π function such as an alkenyl, alkynyl or aryl group, which could optionally be substituted, or an amino group. It is advantageous if the powder material is a material which is coated with a hydrate shell such as glass, ceramic, nitride, oxynitride, carbide, silicide, zirconium oxide, nickel oxide, aluminate, aluminum oxide, plastic or a combination of two or more of these material, but class and ceramic are especially preferred. It is advantageous if the metal layer contains an alloy such as Ni/W, Ni/Sn, Co/W and Co/Mo, a single metal such as Ni, Cu, Ag, Au and platinum metals, or metal oxide(s) such as Cu and $Cu_2O$.

In sintering the metal plated powder according to the present invention, a two-phase material with a continuous conductive phase is formed. The electric resistance is adjusted on the basis of the proportion by volume of the conductive metal phase which develops a type of network. Therefore, the resistivity of the materials can be adjusted reproducibly within narrow limits. However, with the known metal-ceramic composite materials (cermets), the electric resistance is adjusted on the basis of the percolation between metal particles, with the powder and metal being side by side in large proportions. To ensure percolation in powder metal plating with platinum, for example, the proportion of platinum by weight in the metal-powder mixture is greater than 30 wt.

According to the present invention, a method for metal plating with the powder surface being nucleated with a noble metal salt chemically bound to the substrate, can be used to metal plate a powder surface in an electroless operation. It is advantageous if nucleation is performed as in the method described above, because then not only is nucleation especially uniform, but also metal plating is likewise uniform on that basis. Then electroless metal plating is performed in a bath containing one or more salts of metal(s) to be applied and a reducing agent whose reduction potential is coordinated with the salt(s) and optionally the noble metal salt. Complexing yields a very fine, uniform, i.e., closed, metal layer on the powder surface. Since the nucleation layer can also be applied to the surface of powder grains with the nucleation method according to the present invention, the powder surfaces can also be coated with a uniform layer of metal, which was not possible in the past.

DETAILED DESCRIPTION

The following description explains how glass substrates in the form of plates of glass or glass powder are nucleated with palladium and then coated with a layer of nickel/tungsten. However, it should be noted that although the present invention can be used on glass substrates nucleated with palladium and coated with nickel/tungsten, it is not limited to this combination of materials.

An embodiment according to the present invention starts with a glass plate or powdered glass with particle sizes in the range between 100 nm and 300 μm as the substrate. The substrate surface is preferably treated with a digesting agent such as sodium hydroxide, hydrofluoric acid or an $HF/NH_4F$ mixture. This treatment serves in particular to roughen the surface in order to improve the adhesion of the nucleation layer applied later. However, if this treatment is omitted, the applied nucleation layer nevertheless has a substantial adhesion. The substrate is introduced into a 5% to 30% solution, preferably an approximately 10% solution of an organosilicon compound in an inherent solvent such as chloroform at a temperature between 0 and 40 C., preferably at room temperature, and left there for several hours while stirring. The organosilicon compound preferably has the general formula $(A)_n$—X—$(K)_m$, where n and m each denote an integer from 1 to 3, preferably 1, and A is a reactive group that reacts with the glass surface, or more specifically, with its hydrate shell, X is preferably a silanyl moiety, and K is a π function such as an allyl group or an amino group. A typical representative is allyldimethylchlorosilane which reacts with the glass surface, releasing HCl and forming an oxygen bridge to the glass surface. Then the substrate is removed from the solution and dried.

An organic complex of a noble metal salt which is capable of ligand exchange with the functional group K, such as $PdCl_2$. benzonitrile or $PdCl_2$. cyclooctadiene, is reacted with the glass surface activated in the first reaction step. To do so, the glass surface is immersed in a solution of the complex in a solvent, which may be of the same type as the solvent used in the first reaction step. The reaction temperature and the duration of the reaction may be similar to those in the first reaction step. A ligand exchange occurs, with the complexing agent of the noble metal complex being exchanged for the functional group K bound to the substrate. Then the substrate is removed from the solution and dried. The glass substrate is thus nucleated with $PdCl_2$. The $PdCl_2$ may be reduced before the subsequent metal plating step, e.g., by reacting with $NaBH_4$ or other complex boranes, or it may be reduced only during the electroless metal plating.

To measure the amount of $PdCl_2$ deposited per gram of substrate material, the substrate is weighed, then the $PdCl_2$ is dissolved and the quantity of palladium in the solution is determined by atomic absorption spectroscopy or atomic emission spectroscopy. Microscopic examination reveals a uniform discoloration of the substrate surface, indicating a uniform nucleation. Assuming a uniform coverage of the surface by $PdCl_2$ or Pd, then a coverage on the order of 1 to 10 molecular layers is obtained from the amount of Pd adhering to the substrate and the substrate surface area, which is also determined.

To apply a layer of nickel/tungsten alloy to the nucleated glass powder, the powder is exposed to an aqueous solution containing a tungsten salt, preferably a tungstate, a nickel salt, preferably nickel sulfate, and a reducing agent such as a dialkylaminoborane and optionally other additives such as a wetting agent. Then nickel and tungsten are deposited simultaneously on the nucleation layer. The thickness of the applied layer is controlled on the basis of the reaction temperature and reaction time. The reaction temperature is preferably in the range between approximately 60° C. and 100° C., and even more preferably approximately 80° C. The reaction is carried out under alkaline conditions, preferably at a pH between 7.5 and 10.5, and especially preferably at approximately 9, and it lasts between approximately 10 minutes and approximately 30 minutes.

The metal layers thus produced are substantially uniform, which is determined by structural analysis and 4-point resistance measurements in two directions normal to one another on plates produced from the metal plated glass powder by sintering and also on the basis of scanning electron micrographs and optical microscopy. The thickness of the applied layers is between the nanometer range and the micron range, depending on the quantity of metal deposited and the reaction times. To determine this thickness, the quantity of metal deposited on the substrate and then dissolved is determined by atomic emission spectroscopy or atomic absorption spectroscopy, and the powder surface area is determined by conventional methods.

In addition to glass substrates, the present invention can also be used with other substrates that are oxidic or form a superficial oxide film, as well as to surfaces of ceramics, nitride, oxynitride, carbide, silicide, aluminate, zirconium oxide, nickel oxide, aluminum oxide, plastics such as polyimides, polyesters, urethanes, polyamides, silicones, acrylates, styrenes, etc., and combinations of two or more of these materials.

In general, suitable reactants in the first step of the nucleation reaction include preferably bifunctional compounds of the general formula $(A)_n-X-(K)_m$, where the moiety X is selected from the group silanyl moiety, hydrocarbon moieties such as those with two to 10 carbon atoms, zirconyl moiety, titanyl moiety and aluminum moiety and are combined with at least one functional group K such as an alkenyl group, an alkynyl group or an aryl group, optionally substituted, or an amino group and at least one reactive group A selected from a group of halogen, ester group, carboxyl group and acid halide group. Depending on the substrate material, they form, for example, Si—O—Si, Si—O—C, Zr—O—Si, Zr—O—C, Ti—O—Si, Ti—O—C, Ti—O—Si, C—O—C, C—O—Si, Ti—O—Ti, Zr—O—Zr, Al—O—Si or Al—O—Al linkages between the substrate and the X group. In addition to allyldimethylchlorosilane, representatives of these commercially available and/or easily synthesized reactants include, vinylchlorosilanes, oleic acid or linoleic acid, naphthenic acids and aminopropylmethyldiethoxysilane.

Suitable solvents for use in nucleation include, in addition to chloroform, other solvents that can be dried easily such as THF, alkanes, diethyl ethers and other inherent solvents.

In addition to palladium, other noble metals, in particular those of group VIIIB, such as platinum, are suitable for nucleation. The complexing agents for the noble metal salts which are capable of ligand exchange with function K include, in addition to cyclooctadiene and benzonitrile, in particular butadiene and derivatives thereof as well as alkynes.

In addition to the Ni/W alloy, layers including alloys such as Ni/Sn, Co/W and Co/Mo, a single metal such as Ni, Cu, Ag, Au and platinum metals or metal oxide(s) such as CuO and $Cu_2O$ can also be applied with similarly advantageous properties to the nucleation layer according to the present invention. In sheathing with copper, the powder is first irradiated with UV light after the nucleation in order to produce oxygen compounds, and then it is metal plated in a copper bath at room temperature.

The present invention is described in detail below on the basis of two examples.

EXAMPLE 1

Nucleating a Glass Substrate (e.g. Glass Powder)

The two steps of nucleation are illustrated below on the basis of the two following reaction equations:

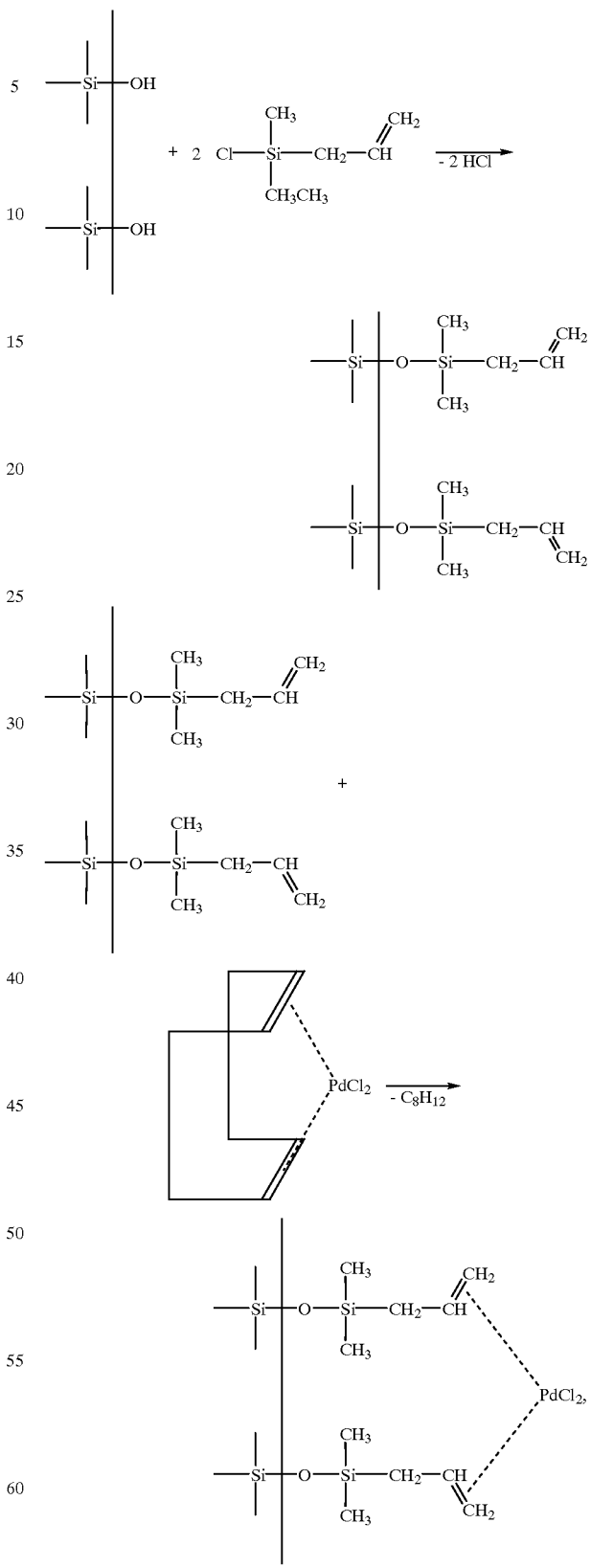

where the long vertical lines represent the substrate surface and the pan-shaped structures represent cyclooctadiene.

Glass powder with particle sizes in the range between approximately 60 µm and 200 µm was digested with dilute hydrofluoric acid to roughen the surface, washed until neutral and dried. Five grams of the powder were placed in 0.5 L of a 10% solution of allyldimethylchlorosilane in chloroform at room temperature. The mixture was stirred overnight at room temperature, whereupon the reaction illustrated by the first reaction equation above took place. Then the solution was separated, and the powder was washed with chloroform and then dried.

The dried powder was treated with 0.5 L of a 10% solution of the cyclooctadiene complex of palladium chloride in chloroform for 12 hours at room temperature while stirring. The reaction illustrated by the second reaction equation given above then took place. Next the solution was separated, and the powder was washed with chloroform and then dried.

Examination under the microscope showed that the powder surface was uniformly colored, indicating that the nucleation was uniform, i.e., uniformly thick and mostly closed. The powder surface area and the quantity of palladium chloride deposited were also determined, and then the layer thickness of the palladium chloride was calculated, assuming a uniformly thick, closed, nucleated surface. The calculated layer thickness was 5 molecular layers.

EXAMPLE 2

Metal Plating a Nucleated Glass Powder 10 g of the glass powder obtained as described in Example 1 was placed in a solution composed of 49.5 g $Na_2WO_4$
65.4 g Na gluconate
6.57 g $NiSO_4 \cdot 6H_2O$
5.13 g dimethylaminoborane
50 mg thiourea
approx. 500 mL $H_2O$ and
approx. 75 mL of a 25% ammonia solution.

The solution had a pH of 9, was heated to 80° C. and stirred. After 10 minutes, the solution was cooled and then separated from the glass powder. The glass powder was washed with water and then dried.

When observed under a light microscope, the powder particles were uniformly coated with a layer of metal. Atomic absorption spectroscopy showed that the metal layer was an Ni/W alloy in a weight ratio of 80:20, with the quantity deposited being 0.2 g. Based on the weight of the metal plated powder, this yields an alloy proportion of 2 wt %. The metal plated powder was sintered to form a plate under a protective gas. Resistance measurements on this plate by the 4-point method in two directions normal to one another yielded uniform resistance values (the measured value was 20Ω).

What is claimed is:

1. A substrate nucleated with a noble metal salt, comprising:
    a portion having a substrate surface, the noble metal salt being chemically bonded to the substrate surface by a first group X—$(K)_m$ and a second group X, the first and second groups being capable of bonding to the substrate surface via at least one oxygen bridge,
    wherein K is a group capable of complexing the noble metal salt,
    wherein m is an integer between 1 and 3,
    wherein X is selected from a group consisting of a hydrocarbon moiety, a zirconyl moiety, a titanyl moiety, and a further moiety which includes aluminum, and
    wherein K is a π function.

2. The substrate according to claim 1, wherein m is an integer with a value of 1.

3. The substrate according to claim 1, wherein K is an amino group.

4. The substrate according to claim 1, wherein the substrate is composed of a material which is one of oxidic and capable of forming an oxide film at the substrate surface, the material comprising at least one of:
    a glass material, a ceramic material, nitride, oxynitride, carbide,
    suicide, zirconium oxide, nickel oxide, aluminate, aluminum oxide, and a plastic material.

5. The substrate according to claims 1, wherein the substrate has a form of a powder having a particle size between approximately 100 nm and approximately 300 µm.

6. The substrate according to claim 1, wherein the noble metal salt includes a particular metal from group VIIIB.

7. The substrate according to claim 6, wherein the particular metal is one of palladium and platinum.

8. The substrate according to claim 1, wherein K is selected from the group consisting of an alkenyl group, a substituted alkenyl group, an alkynyl group, a substituted alkynyl group, an aryl group, and a substituted aryl group.

9. A method for a nucleation of substrates using a noble metal salt, the substrate having a substrate surface which is one of an oxidic surface and a surface coated with an oxide film, the method comprising the steps of:
    chemically bonding the noble metal salt on the substrate surface via a chemical reaction by mediating an at least bifunctional compound having a formula $(A)_n$—X—$(K)_m$, the bifunctional compound being capable of entering into a further compound via the substrate surface and the noble metal salt, wherein A is a first group which is reactable with a hydrate shell on an oxide for forming an oxygen bridge to a second group X, wherein X is selected from a group consisting of a hydrocarbon moiety, a zirconyl moiety, a titanyl moiety, and a further moiety which includes aluminum, wherein K is a π function and is a group which is capable of complexing the noble metal salt, and wherein n and m are integers having values between 1 and 3; and
    reacting the first group with a soluble complex noble metal compound which is capable of a ligand exchange with the π function.

10. The method according to claim 9, further comprising the step of:
    reducing the noble metal salt.

11. The method according to claim 9, wherein at least one of n and m is equal to 1.

12. The method according to claim 9, wherein K is an amino group and wherein A is selected from a group consisting of a halogen, an ester group, a carboxyl group and an acid halide group.

13. The method according to claim 9, wherein the at least bifunctional compound is selected from a group consisting of allyldimethylchlorosilane, one of an oleic acid and a linoleic acid, naphthenic acids and aminopropylmethyldiethoxysilane.

14. The method according to claim 9, further comprising the step of:
    complexing the noble metal salt with a complexing agent.

15. The method according to claim 14, wherein the complexing agent includes one of cyclopentadiene and benzonitrile.

16. The method according to claim 9, wherein the substrate is composed of a material which is one of oxidic and capable of forming an oxide film at the substrate surface, the material comprising at least one of:
a glass material, a ceramic material, nitride, oxynitride, carbide,
silicide, zirconium oxide, nickel oxide, aluminate, aluminum oxide, and a plastic material.

17. The method according to claim 9, further comprising the step of:
treating the substrate before the nucleation with digesting agents.

18. The method according to claim 17, wherein the digesting agents are alkali metal hydroxide.

19. The method according to claim 18, wherein alkali metal hydroxide includes one of sodium hydroxide and a solution containing a hydrofluoric acid.

20. The method according to claim 19, wherein the hydrofluoric acid includes one of a hydrofluoric acid solution and a solution containing a $HF/NH_4F$ mixture.

21. A powder nucleated with a noble metal salt, comprising:
a nucleation portion which is coated with a metal layer, the nucleation portion including a nucleation surface, the noble metal salt being chemically bonded to the nucleation surface by a first group $X-(K)_m$ and a second group X, the first and second groups being capable of bonding to the nucleation surface via at least one oxygen bridge,
wherein K is a group capable of complexing the noble metal salt,
wherein m is an integer between 1 and 3,
wherein X is selected from a group consisting of a hydrocarbon moiety, a zirconyl moiety, a titanyl moiety, and a further moiety which includes aluminum, and
wherein K is a π function.

22. The powder according to claim 21, wherein m is an integer with a value of 1.

23. The powder according to claim 21, wherein K is an amino group.

24. The powder according to claim 21, wherein the powder is composed of a material which is one of oxidic and capable of forming an oxide film at the nucleation surface, the material comprising at least one of:
a glass material, a ceramic material, nitride, oxynitride, carbide,
silicide, zirconium oxide, nickel oxide, aluminate, aluminum oxide, and a plastic material.

25. The powder according to claim 24, wherein the material is one of the glass material and the ceramic material.

26. The powder according to claim 21, wherein the metal layer includes one of an alloy, a single metal and one of a platinum metal and a metal oxide.

27. The powder according to claim 26, wherein the alloy is one of Ni/W, Ni/Sn, Co/W and Co/Mo, wherein the single metal is one of Ni, Cu, Ag, Au, and wherein one of the platinum metal and the metal oxide is CuO or $Cu_2O$.

28. The powder according to claim 21, wherein the powder has a particle size in between approximately 100 nm and approximately 300 μm.

29. A method for metal plating a powder having a powder surface, comprising the steps of:
(a) chemically bonding a noble metal salt to the powder surface;
(b) nucleating the powder surface with the chemically bound noble metal salt via a chemical reaction by mediating an at least bifunctional compound having a formula $(A)_n-X-(K)_m$, the bifunctional compound being capable of entering into a further compound via the powder surface and the noble metal salt, wherein A is a first group which is reactable with a hydrate shell on an oxide for forming an oxygen bridge to a second group X, wherein X is selected from a group consisting of a hydrocarbon moiety, a zirconyl moiety, a titanyl moiety, and a further moiety which includes aluminum, wherein K is a π function and is a group which is capable of complexing the noble metal salt, and wherein n and m are integers having values between 1 and 3;
(c) reacting the first group with a soluble complex noble metal compound which is capable of a ligand exchange with the π function;
(d) after step (c), electroless metal plating the powder surface; and
(e) after step (c), electroless metal plating the powder in a bath containing at least one salt of at least one metal to be applied and a reducing agent having a reduction potential, the reduction potential being coordinated with the at least one salt.

30. The method according to claim 29, wherein the reduction potential is further coordinated with the noble metal salt.

* * * * *

UNITED STATES PATENT AND TRADEMARK OFFICE
CERTIFICATE OF CORRECTION

PATENT NO. : 6,274,241 B1 Page 1 of 1
DATED : August 14, 2001
INVENTOR(S) : Weber Lothar et al.

It is certified that error appears in the above-identified patent and that said Letters Patent is hereby corrected as shown below:

Title page, Item [54] and Column 1, line 1,
Change the title to read -- SUBSTRATES NUCLEATED WITH NOBLE METAL SALTS, METHOD OF PRODUCING SAME AND USE THEREOF --

Column 3,
Line 10, change "class" to -- glass --

Column 8,
Line 12, change "suicide" to -- silicide --

Signed and Sealed this

Twenty-fourth Day of December, 2002

JAMES E. ROGAN
*Director of the United States Patent and Trademark Office*